United States Patent
Katherine et al.

(10) Patent No.: US 11,686,335 B2
(45) Date of Patent: Jun. 27, 2023

(54) LOCK RETAINER FOR FACILITATING SECURED CONNECTION OF ADJACENT WALL FRAME ELEMENTS, AND ASSOCIATED MODULAR WALL FRAME SYSTEM

(71) Applicant: Moss Holding Company, Franklin Park, IL (US)

(72) Inventors: Heidi Katherine, Chicago, IL (US); Joe Brooks, Wadsworth, IL (US)

(73) Assignee: Moss Holding Company, Franklin Park, IL (US)

( * ) Notice: Subject to any disclaimer, the term of this patent is extended or adjusted under 35 U.S.C. 154(b) by 28 days.

(21) Appl. No.: 17/334,220

(22) Filed: May 28, 2021

(65) Prior Publication Data
US 2022/0381278 A1    Dec. 1, 2022

(51) Int. Cl.
*F16B 12/34*    (2006.01)
*E04B 2/74*    (2006.01)

(52) U.S. Cl.
CPC ............ *F16B 12/34* (2013.01); *E04B 2/7422* (2013.01)

(58) Field of Classification Search
CPC .... F16B 12/34; F16B 2200/40; E04B 2/7422; E04B 2/7425; E04B 2/7437; E04B 2/7448; E04B 2/7453; E04B 2/7474; E04B 1/6183; E04B 1/34384; E04C 2/384; Y10T 403/59
See application file for complete search history.

(56) References Cited

U.S. PATENT DOCUMENTS

| | | | |
|---|---|---|---|
| 3,901,612 A | 8/1975 | Canin | |
| 5,271,586 A | 12/1993 | Schmidt | |
| 5,628,598 A | 5/1997 | Hofle | |
| 8,657,545 B2 | 2/2014 | Magno, Jr. et al. | |
| 8,956,071 B2 | 2/2015 | Frey | |
| 9,453,592 B2 | 9/2016 | Zhang et al. | |
| 10,030,395 B2 | 7/2018 | Fountain | |
| 10,107,323 B2 | 10/2018 | Williams | |
| 2015/0354611 A1* | 12/2015 | Wasankari | F16B 2/18 403/321 |

FOREIGN PATENT DOCUMENTS

| | | | | |
|---|---|---|---|---|
| BE | 1018393 A6 | 10/2010 | | |
| BE | 1022807 A1 | 9/2016 | | |
| CN | 210181857 U | 3/2020 | | |
| WO | WO-2008052269 A1 * | 5/2008 | ......... | A47B 47/0041 |
| WO | 2021048728 A1 | 3/2021 | | |

* cited by examiner

*Primary Examiner* — Patrick J Maestri
(74) *Attorney, Agent, or Firm* — Lance M. Pritikin (57) ABSTRACT

A lock retainer for facilitating the secured connection of an adjacent pair of wall frame elements to one another by way of a lock cassette having an actuatable grip portion is disclosed. The lock retainer may comprise a flange portion disposed between a proximal portion and distal portion. A cassette compartment may retainingly engage a portion of the lock cassette with the grip portion remaining outward the lock retainer. The proximal portion is configured to be mounted in a retainer mounting aperture in a frame segment of a wall frame element. The lock retainer may include a retainer detent moveable between a securing and releasing positions. The detent may be resiliently biased toward the securing position. The detent may be on a detent lever having a release actuation portion enabling a user to manually overcome the resilient bias. Also disclosed is a modular wall frame system incorporating the lock retainer.

23 Claims, 12 Drawing Sheets

PRIOR ART

LOCK RETAINER FOR FACILITATING SECURED CONNECTION OF ADJACENT WALL FRAME ELEMENTS, AND ASSOCIATED MODULAR WALL FRAME SYSTEM

TECHNICAL FIELD

The disclosure herein relates generally to devices for securing wall frames to one another to form larger wall frameworks, such as for trade show display walls.

BACKGROUND

Conventional expedients for connecting extruded-member frameworks together to form walls, such as display walls used at trade shows and the like, are represented in part by publications such as U.S. Pat. No. 8,956,071 (Frey) and U.S. Pat. No. 8,196,326 (Frey). What is needed are devices and systems which make it faster, cheaper, safer and easier to securely connect adjacent wall frame elements to one another to form temporary wall frameworks. What is also needed is an improved mechanism to enable assemblers of temporary wall systems to connect a variety of frames to one another in order to support wall panels of various shapes, thus providing enhanced flexibility to the wall designer.

SUMMARY

Certain deficiencies of the prior art are overcome by the provision of embodiments of a lock retainer and associated modular wall frame system in accordance with the present disclosure. In preferred implementations, the lock retainer allows a retained lock cassette to be attached to and detached from wall frame segments, by way of snap-fit for example, at various locations along the frame segment without requiring tools.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Referring now to the drawings, like reference numerals designate identical or corresponding features throughout the several views. Wherever a reference numeral includes a letter, that letter merely designates a particular instance of the feature designated by the numeral by itself. For example, two distinct instances of a wall element identified as 102 may be respectively identified by reference numerals 102a and 102b.

Figures 35, 36, 37, 38:
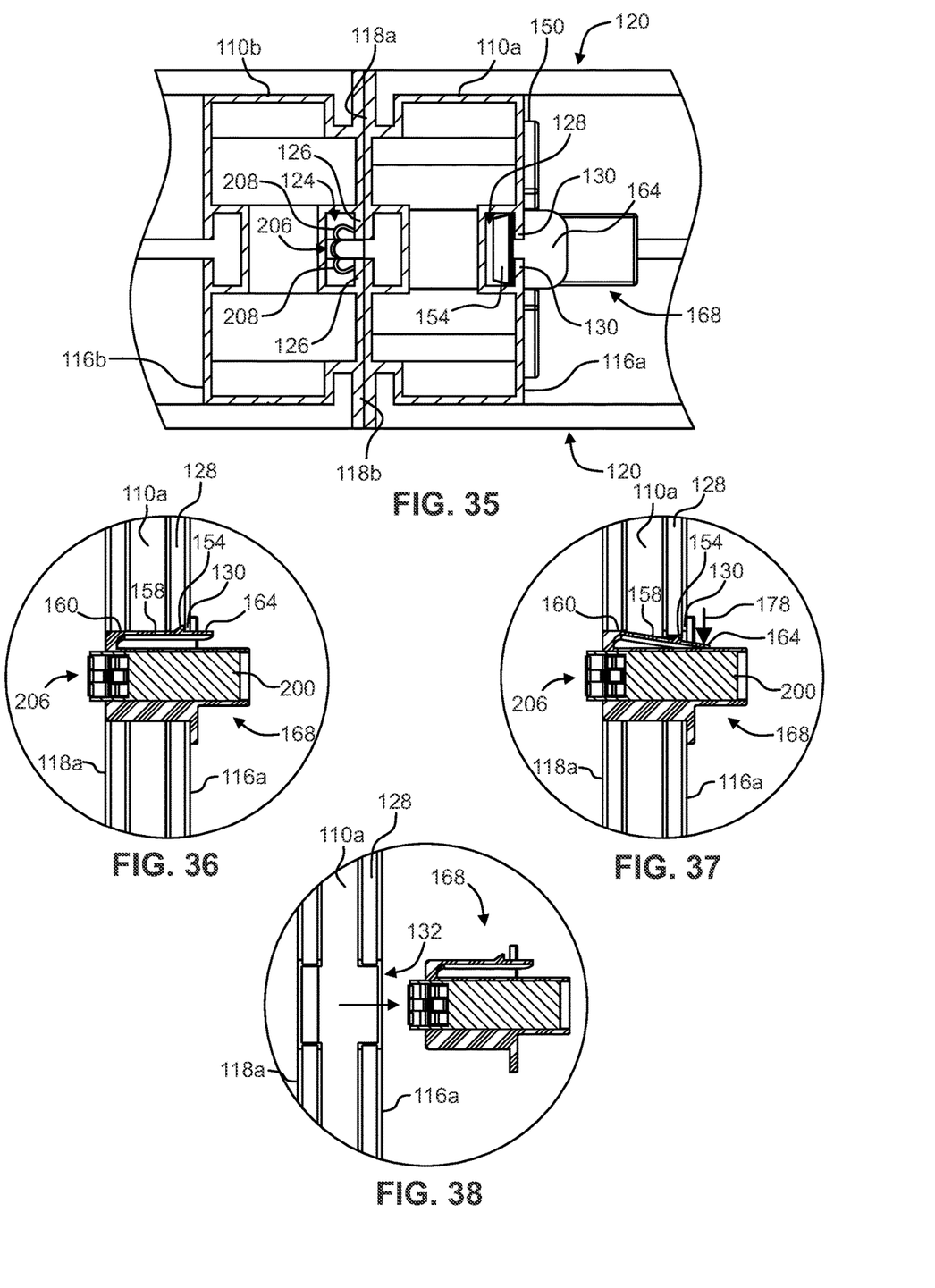
FIG. 35 is a diagrammatic cross-sectional view taken across lines 35-35 of FIG. 34.
FIG. 36 is a diagrammatic partial cross-sectional view taken across lines 36-36 of FIG. 34.
FIG. 37 is a diagrammatic partial cross-sectional view similar to that of FIG. 36, but wherein the retainer detent is shown having been moved to a releasing position thereby freeing the lock subassembly to be removed from the retainer mounting aperture of the corresponding frame segment.
FIG. 38 is a diagrammatic partial cross-sectional view similar to that of FIG. 36, but wherein the retainer detent is shown having been removed from the retainer mounting aperture of the corresponding frame segment.

With reference to the several drawings, various embodiments of a lock retainer are illustrated generally at 134, and are preferably configured for facilitating the secured connection of an adjacent pair of wall frame elements 102 to one another by way of a lock cassette 200 having an actuatable grip portion 206. This, in turn, allows for the efficient set up and tear-down of a modular wall frame system 100, such as the example system shown in FIGS. 39 and 40. The lock cassette 200 may be elongated along a cassette axis 202, and may be of a conventional type in which the grip portion 206 is actuatable between a grip configuration and a neutral configuration by way of respective rotational movement of the grip actuation element 210. This rotation is typically by way of a torquing tool (like a screwdriver) having a head that matches the engagement feature in the face of the grip actuation element 210. As illustrated in FIG. 35, in the grip configuration, some of the grip elements 208 move laterally apart from one another, thereby lockingly expanding the grip portion 206 within a selected lock engagement channel 124 of an adjacent frame segment 110.

Figures 1, 2, 3, 4, 5, 6, 7, 8:
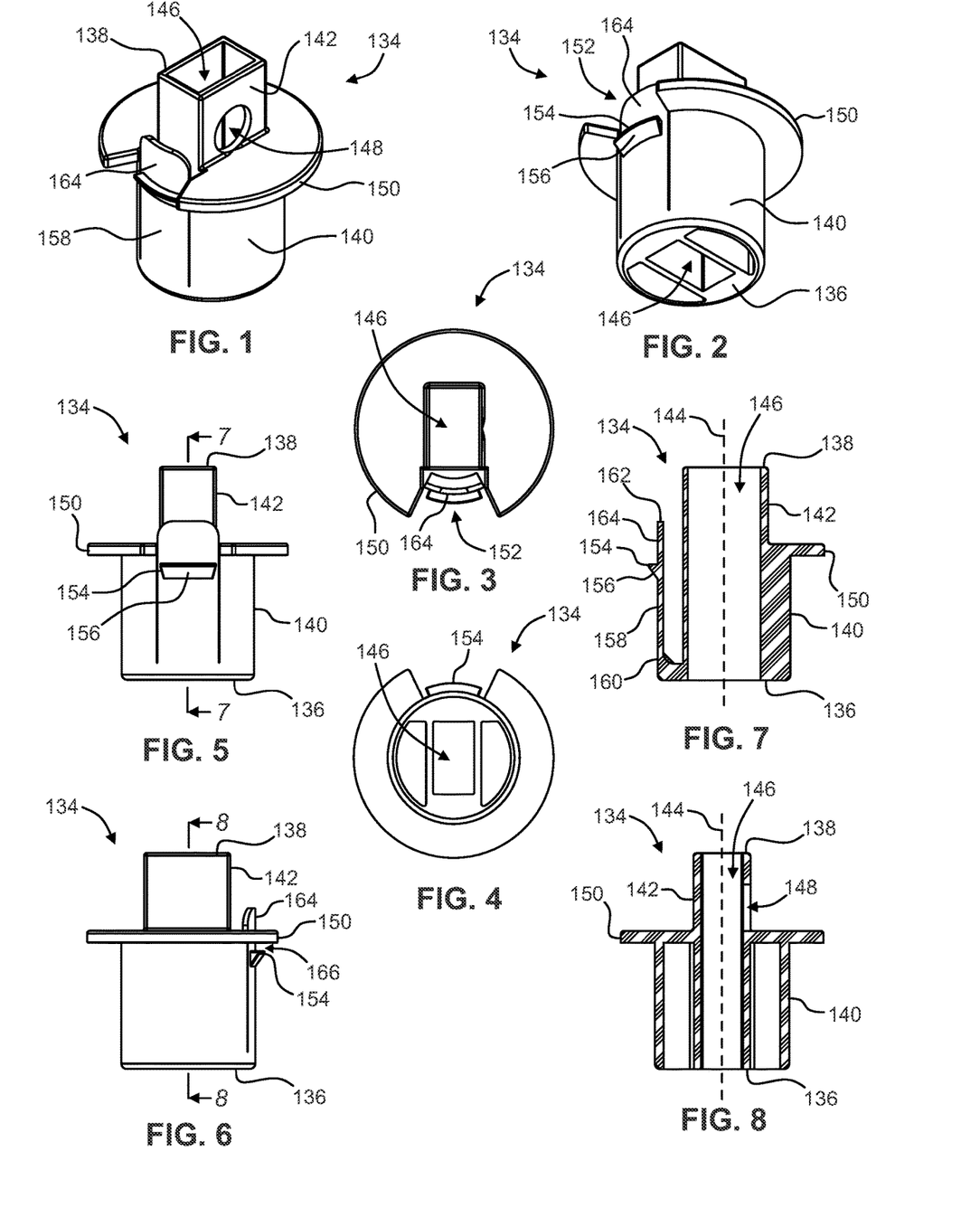
FIG. 1 is a diagrammatic perspective view of one non-limiting example of a lock retainer in accordance with the present disclosure.
FIG. 2 is a further diagrammatic perspective view of the example lock retainer of FIG. 1.
FIG. 3 is a diagrammatic top view of the example lock retainer of FIG. 1.
FIG. 4 is a diagrammatic bottom view of the example lock retainer of FIG. 1.
FIG. 5 is a diagrammatic front view of the example lock retainer of FIG. 1.
FIG. 6 is a diagrammatic side view of the example lock retainer of FIG. 1, shown from a viewpoint perpendicular to FIG. 5.
FIG. 7 is a diagrammatic cross-sectional view taken across lines 7-7 of FIG. 5.
FIG. 8 is a diagrammatic cross-sectional view taken across lines 8-8 of FIG. 6.
Figure 18:
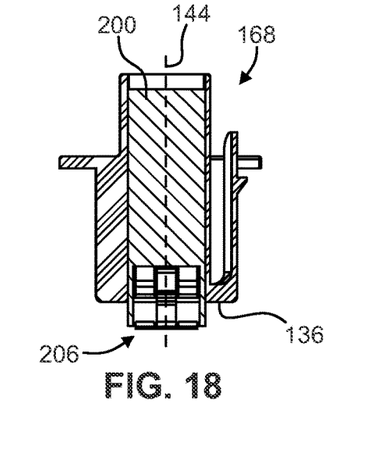
FIG. 18 is a diagrammatic cross-sectional view taken across lines 18-18 of FIG. 15.
Figure 20:
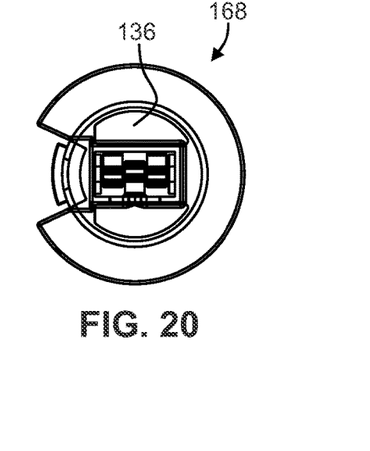
FIG. 20 is a diagrammatic bottom view of the example lock subassembly of FIG. 14.
Figure 21:
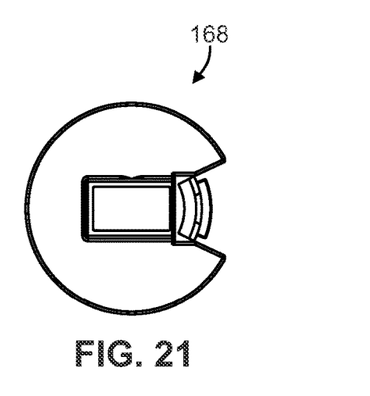
FIG. 21 is a diagrammatic top view of the example lock subassembly of FIG. 14.
Figure 22:
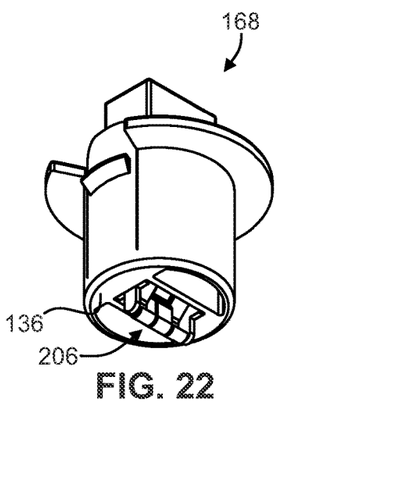
FIG. 22 is a diagrammatic perspective view of the example lock subassembly of FIG. 14.

Referring to FIGS. 1 and 7, the lock retainer 134 may comprise a proximal portion 140 defining a proximal end 136, a distal portion 142 defining a distal end 138, and a retainer axis 144 defined as extending from the proximal end 136 to the distal end 138. A flange portion 150 may be being disposed between the proximal portion 140 and the distal portion 142. Referring to FIGS. 7 and 18, a cassette compartment 146 may extend along the retainer axis 144 and may be configured to retainingly engage at least a portion of the lock cassette 200 therein with the grip portion 206 remaining outward of the proximal end 136. The lock retainer 134 and lock cassette 200 may thereby combine to define a lock subassembly 168.

Figure 23:
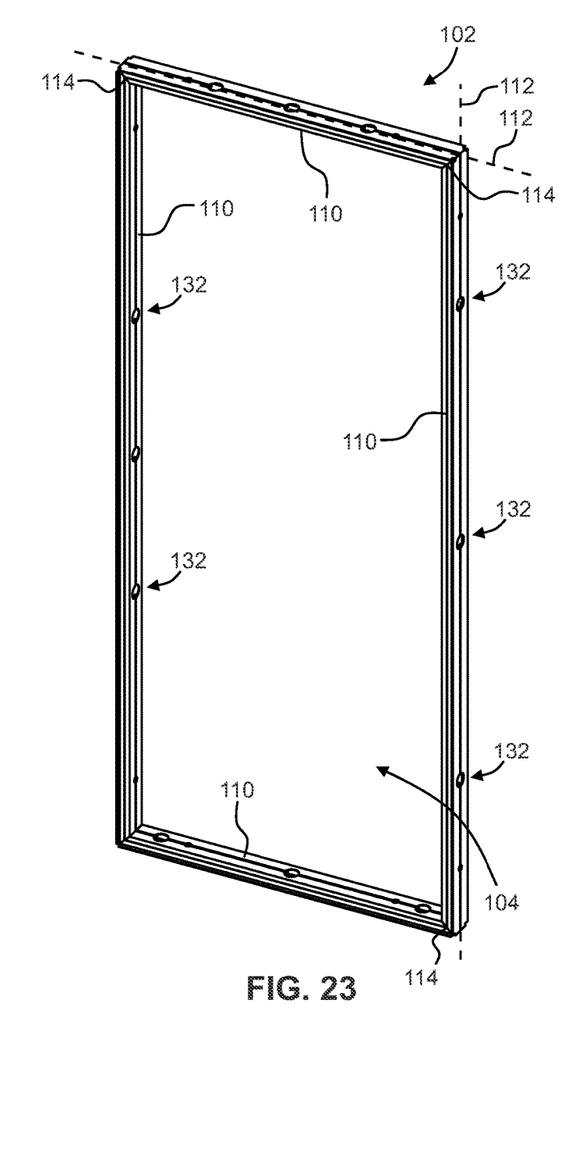
FIG. 23 is a diagrammatic perspective view of one non-limiting example of a wall frame element in accordance with the present disclosure.
Figure 24:
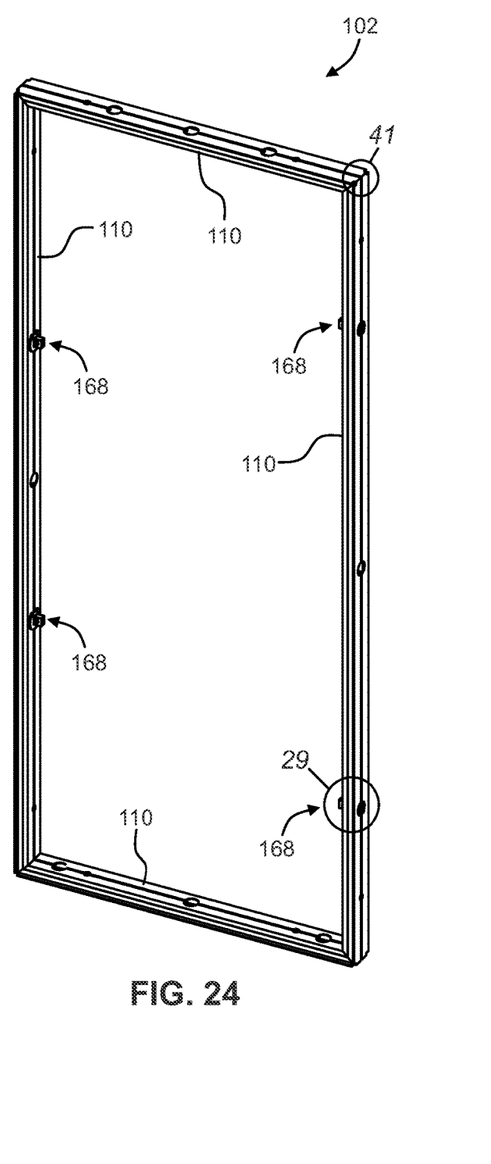
FIG. 24 is a diagrammatic perspective view similar to that of FIG. 23, but wherein lock subassemblies are shown in removable securement with respective frame segments of the example wall frame element.
Figures 25, 26, 27:
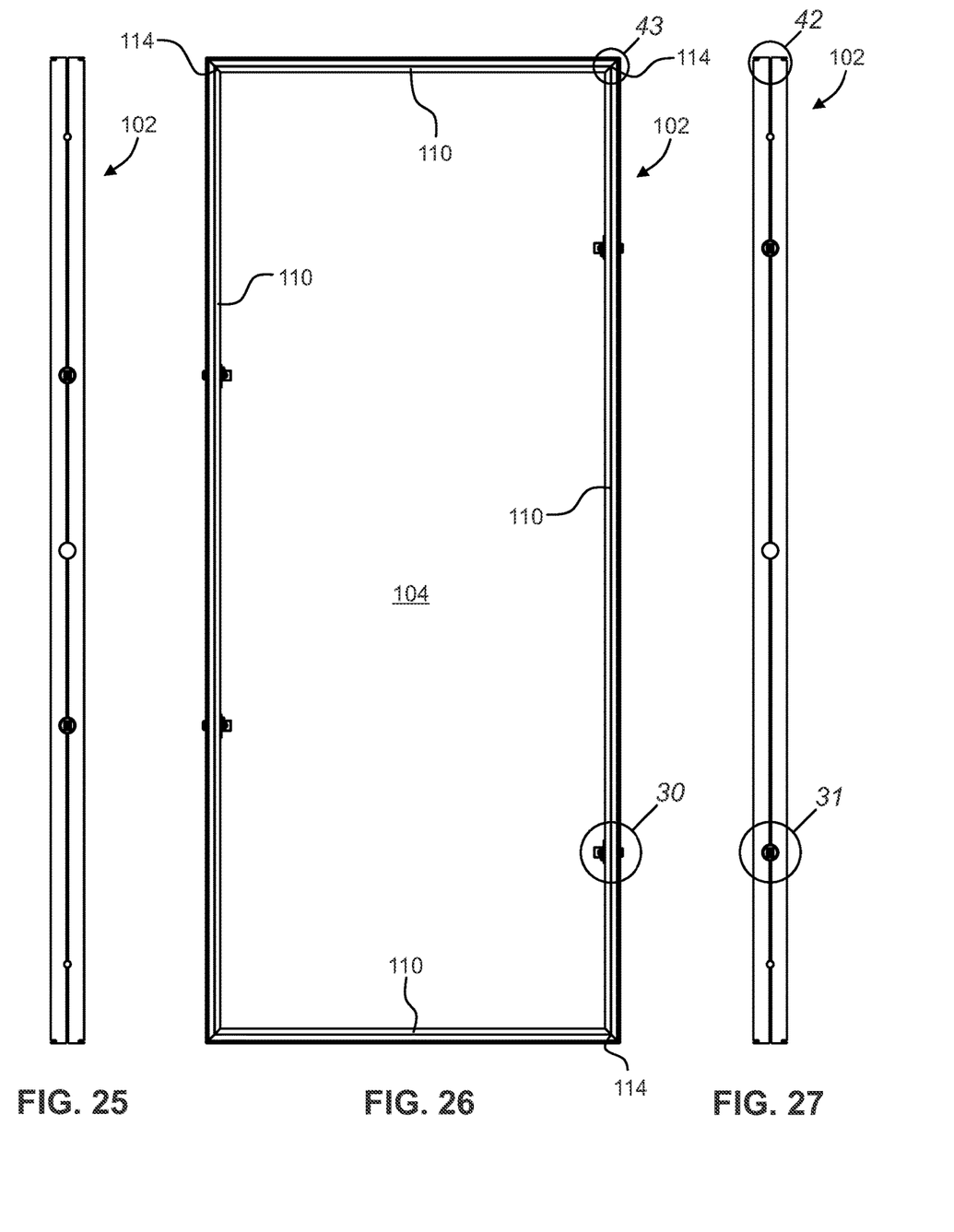
FIG. 25 is a diagrammatic side view of the wall frame element configuration of FIG. 24.
FIG. 26 is a diagrammatic front view of the wall frame element configuration of FIG. 24.
FIG. 27 is a further diagrammatic side view of the wall frame element configuration of FIG. 24, shown from a viewpoint opposite of FIG. 25.
Figure 28:
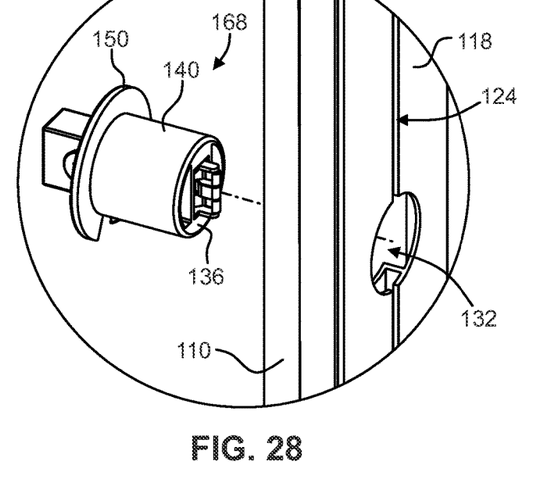
FIG. 28 is a diagrammatic partial perspective view illustrating an example lock subassembly being placed into removable securement with a corresponding frame segment.
Figure 29:
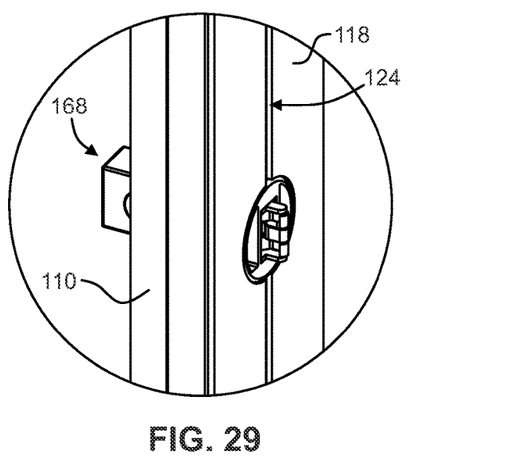
FIG. 29 is a magnified view of detail 29 in FIG. 24, illustrating an example lock subassembly in removable securement with a corresponding frame segment following the step shown in FIG. 28.
Figure 30:
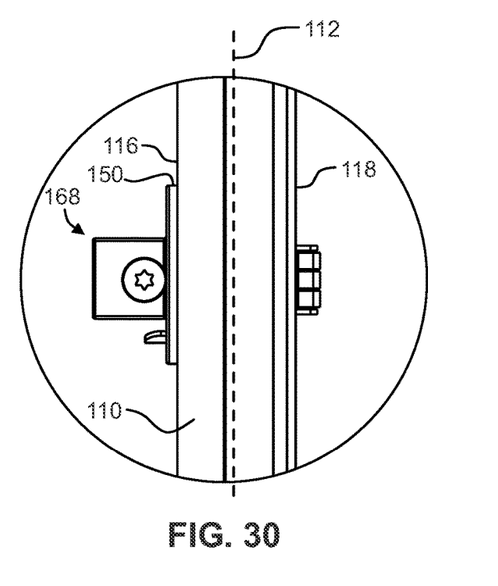
FIG. 30 is a magnified view of detail 30 in FIG. 26, illustrating an example lock subassembly in removable securement with a corresponding frame segment.
Figure 31:
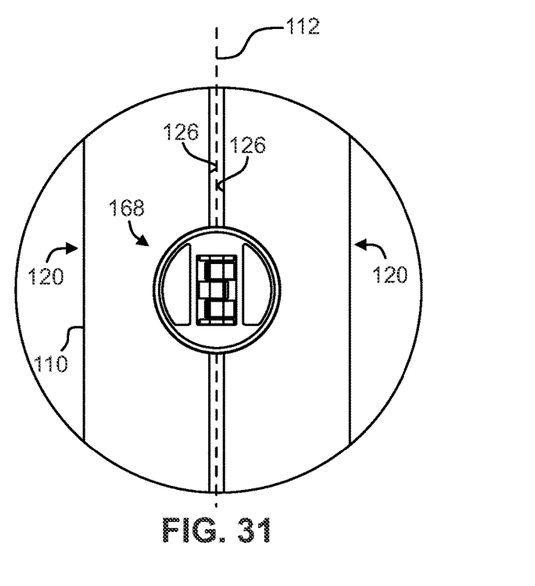
FIG. 31 is a magnified view of detail 31 in FIG. 27, illustrating an example lock subassembly in removable securement with a corresponding frame segment.

Referring to FIGS. 23, 28 and 29, the proximal portion 140 is preferably configured to be placed in mounted engagement with a retainer mounting aperture 132 in a frame segment 110 of a wall frame element 102. In certain preferred implementations of a lock retainer 134, the proximal portion 140 may be circular-cylindrical in shape.

Figure 10:
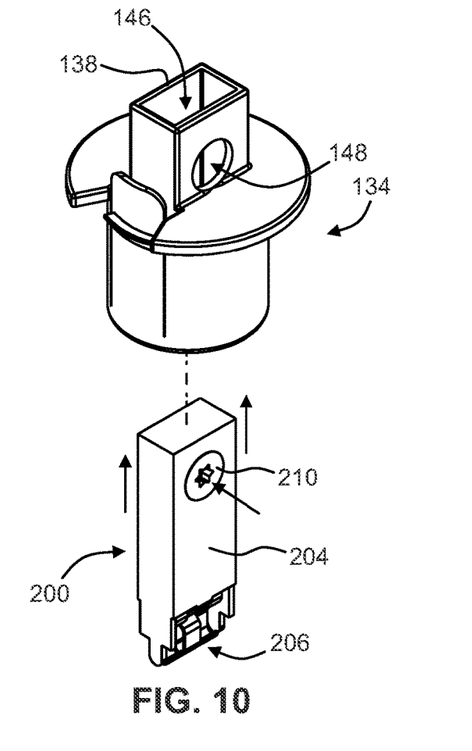
FIG. 10 is a diagrammatic perspective view illustrating an example lock cassette being inserted into restrained engagement with the corresponding lock retainer to collectively form a lock subassembly, wherein the grip actuation element is shown pressed inward toward the cassette housing to allow the caseate housing to slide axially into the cassette compartment of the lock retainer.
Figure 11:
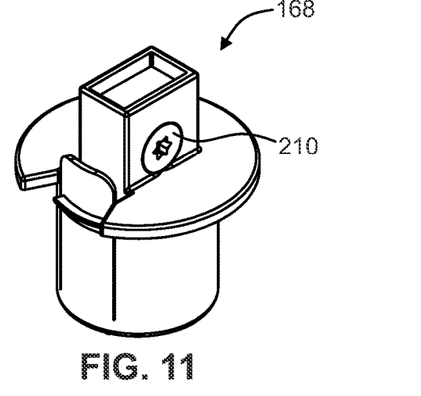
FIG. 11 is a diagrammatic perspective view of the lock subassembly resulting from the process illustrated in FIG. 10.
Figure 12:
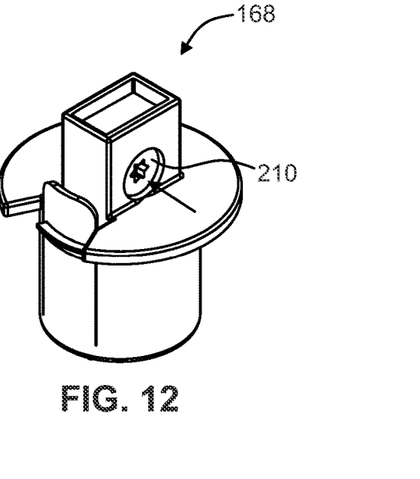
FIG. 12 is a diagrammatic perspective view of the lock subassembly similar to that shown in FIG. 11, but wherein the grip actuation element is shown pressed inward to disengage it from the actuator port, thereby allowing the lock cassette to be disassembled from the lock retainer.
Figure 13:
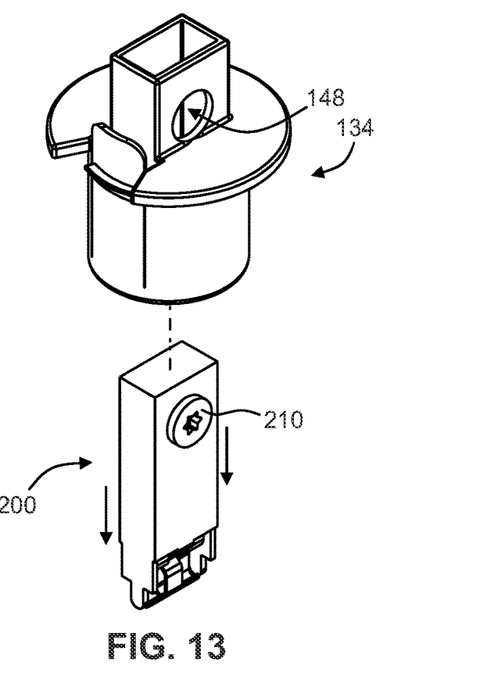
FIG. 13 is a diagrammatic perspective view of the lock subassembly having been disassembled following the step illustrated in FIG. 12.
Figure 14:
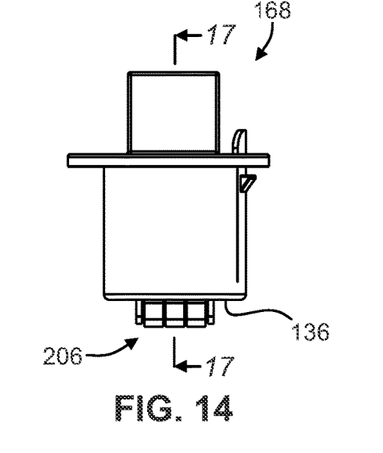
FIG. 14 is a diagrammatic side view of one non-limiting example of a lock subassembly in accordance with the present disclosure.
Figure 15:
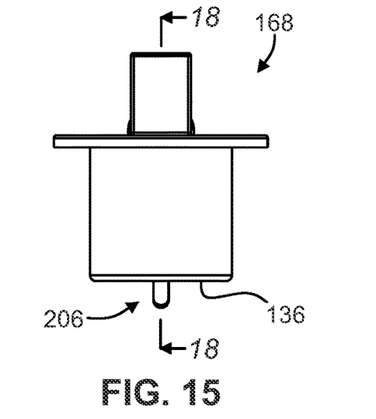
FIG. 15 is a diagrammatic rear view of the example lock subassembly of FIG. 14, shown from a viewpoint perpendicular to FIG. 14.
Figures 16, 19:
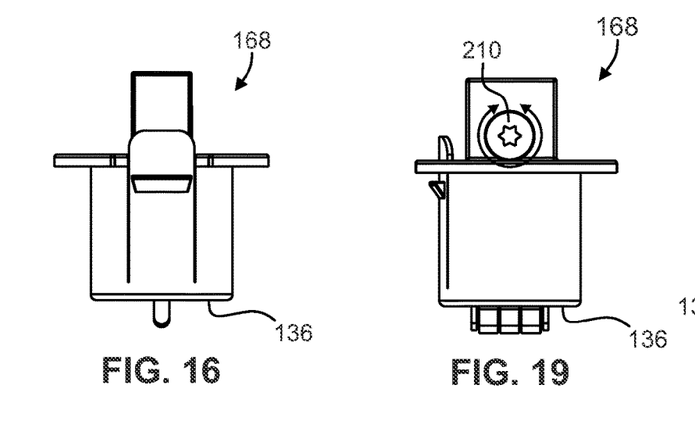
FIG. 16 is a diagrammatic front view of the example lock subassembly of FIG. 14.
FIG. 19 is a further diagrammatic side view of the example lock subassembly of FIG. 14, shown from a viewpoint opposite of FIG. 14.

Referring to FIGS. 8 and 18, the lock retainer 134 is preferably configured such that the retaining engagement obstructs relative translational movement between the lock cassette 200 and the lock retainer 134 along the retainer axis 144. By way of example, Referring to FIG. 8, the distal portion 142 of the lock retainer 134 may include an actuator port 148 open laterally of the retainer axis 144. Referring to FIGS. 10 and 11, the actuator port 148 may be configured to receive a grip actuation element 210 of the lock cassette 200. Notably, referring to FIGS. 9 and 10, the grip actuation element 210 may be configured to be manually depressible into the cassette housing 204. This manual depressibility is preferably spring biased toward an uncompressed position, as shown for example in FIG. 9. As illustrated in FIGS. 10 to 13, this allows a user to quickly and easily place the lock cassette 200 into and out of restrained engagement with the cassette compartment 146 of the lock retainer 134.

Figure 17:
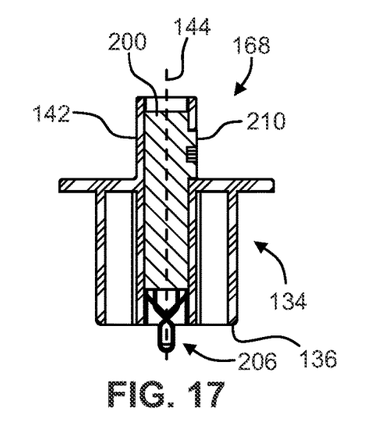
FIG. 17 is a diagrammatic cross-sectional view taken across lines 17-17 of FIG. 14.

Referring to FIG. 17, in certain preferred implantations of a lock retainer 134, the receipt of the grip actuation element 210 facilitates the obstruction of relative translational movement between the lock cassette 200 and the lock retainer 134 along the retainer axis 144. Moreover, in particular preferred implementations of a lock retainer 134, the retaining engagement obstructs relative rotation between the lock cassette 200 and the lock retainer 134 about the retainer axis 144.

Referring to FIGS. 2 and 7, the lock retainer 134 may comprise a retainer detent 154 moveable between a securing position (see, for example, FIG. 36) and a releasing position (see, for example, FIG. 37). Referring to FIG. 6, a lip retention gap 166 may be defined between the retainer detent 154 and the flange portion 150. The retainer detent 154 may be resiliently biased toward the securing position.

Referring to FIG. 6, the retainer detent 154 may be disposed on a detent lever 158 with a fixed end 160 and a free end 162. The free end 162 may have a release actuation portion 164 thereat which is configured to enable a user to manually overcome the resilient bias. For example, referring to FIG. 37, the user may apply a manual force 178 pressing the actuation portion 164 inward toward the distal portion 142. Referring again to FIG. 6, the fixed end 160 of the detent lever 158 may preferably be affixed to the proximal portion 140, and the retainer detent 154 may be disposed between the fixed end 160 and the release actuation portion 164. Referring to FIG. 8, in certain preferred implementations of a lock retainer 134, the flange portion 150 may extend radially outward of the retainer axis 144. Referring to FIGS. 2 and 3, in such cases, the flange portion 150 may include a relief groove 152 by which the release actuation 164 portion extends through the flange portion 150. Referring to FIGS. 2 and 7, the retainer detent 154 may include a ramped face 156 oriented toward the proximal end 136. Referring to FIGS. 7 and 36, this ramped face 156 may be configured to allow the retainer detent 154 gradually engage the auxiliary channel lips 130 and thereby automatically force the retainer detent 154 toward the releasing position when the lock subassembly 168 is being inserted into the retainer mounting aperture 132.

Figure 32:
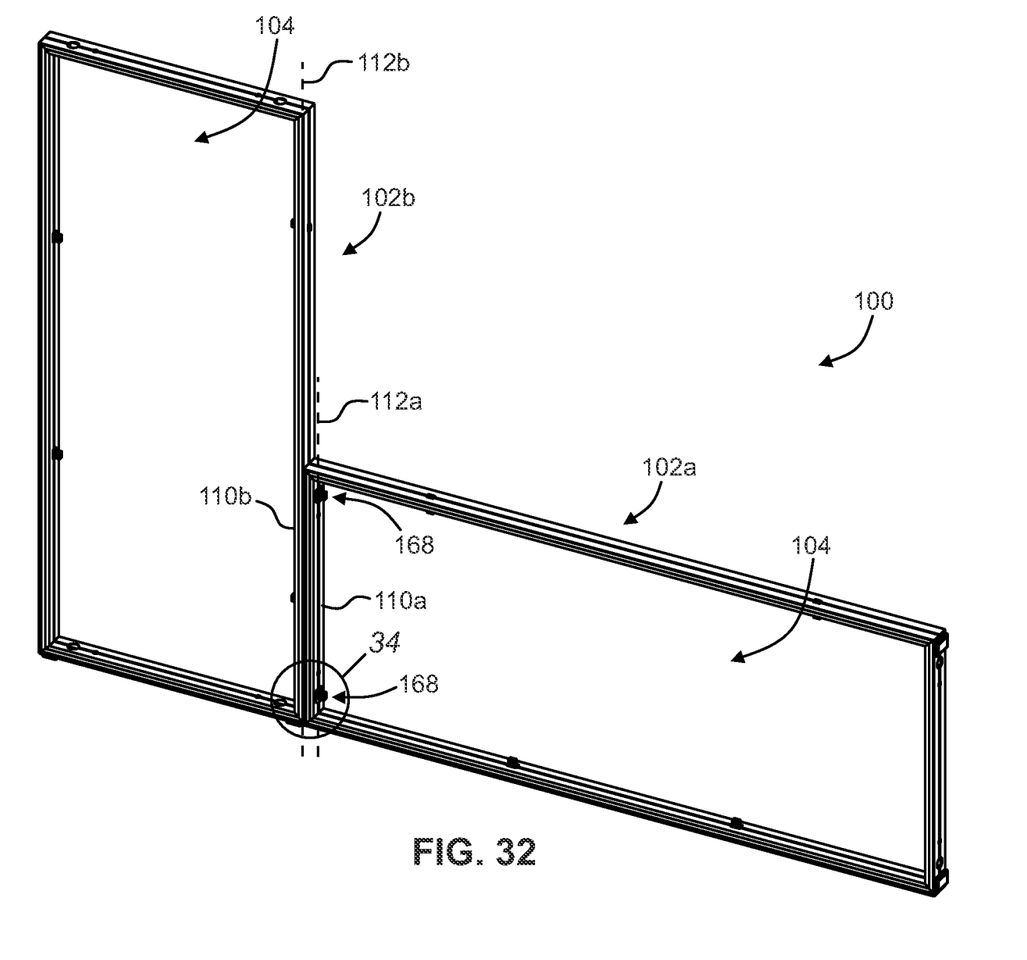
FIG. 32 is a diagrammatic perspective view of one non-limiting example of a modular wall frame system including a pair of wall frame elements rigidly connected to one another by way of a pair of lock subassemblies.
Figure 33:
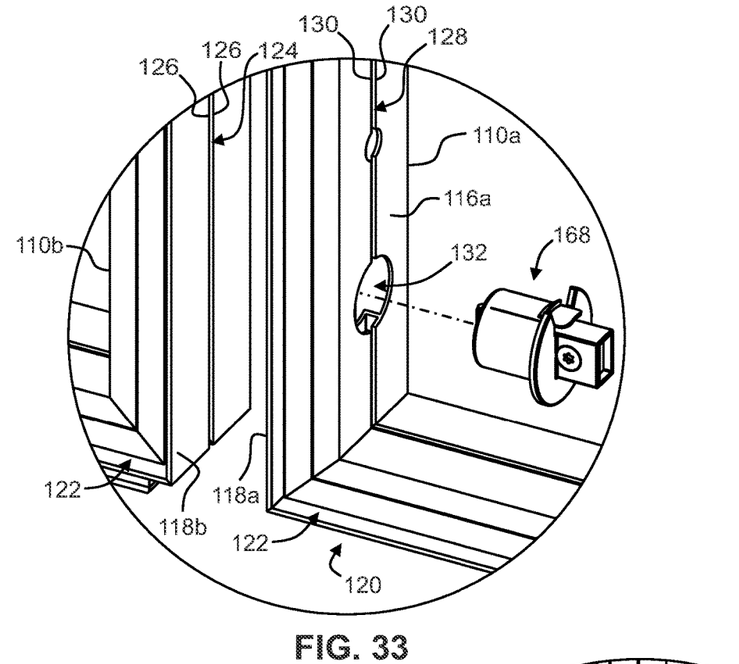
FIG. 33 is a diagrammatic partial perspective view illustrating a pair of adjacent frame segments of respective wall frame elements prior to being rigidly connected to one another by way of at least one lock subassembly.
Figure 34:
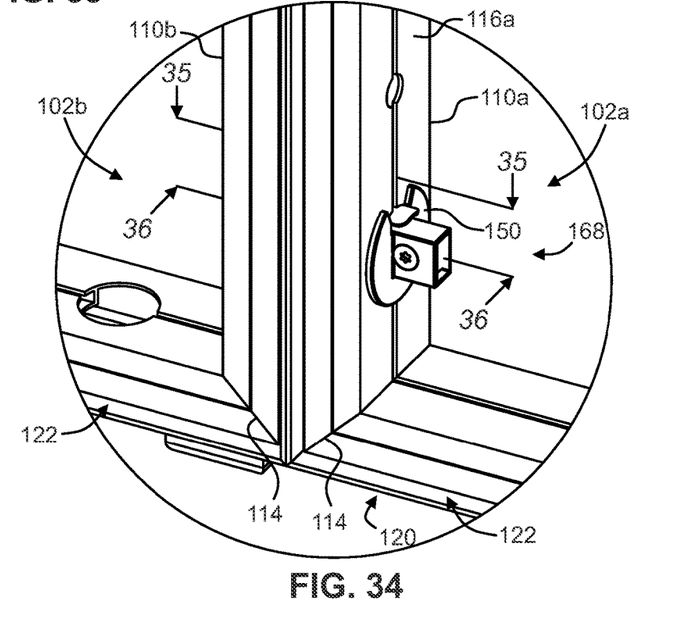
FIG. 34 is a magnified view of detail 34 in FIG. 32, illustrating a pair of adjacent frame segments of respective wall frame elements rigidly connected to one another by way of at least one lock subassembly.

Referring now to FIGS. 32 to 34, a modular wall frame system 100 may comprise a first wall frame element 102a, a second wall frame element 102b, a lock cassette 200, and a lock retainer 134. The first wall frame element 102a may include a first frame segment 110a. The first frame segment 110a may be elongated along a first segment axis 112a and include a first inboard face 116a and a first outboard face 118a. A retainer mounting aperture 132 may extend between the first inboard face 116a and the first outboard face 118. The second wall frame element 102b may include a second frame segment 110b. The second frame segment 110b may be elongated along a second segment axis 112b and have a second outboard face 118b with a lock engagement channel 124 disposed inward thereof. Lock engagement channel 124 may include lock channel lips 126. The frame segments may preferable be comprised of extruded aluminum or the like.

Figure 9:
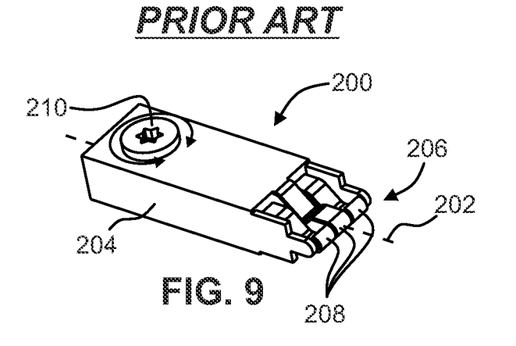
FIG. 9 is a diagrammatic perspective view of one prior art non-limiting example of a lock cassette in accordance with the present disclosure.

Referring to FIG. 9, the lock cassette 200 may have a grip portion 206 and a grip actuation element 210. The grip portion 206 may be movable between a grip configuration (see, for example FIG. 35) and a neutral configuration by way of the grip actuation element 210. Referring to FIG. 7, the lock retainer 134 may include a proximal portion 140 defining a proximal end 136, a distal portion 142 defining a distal end 138, and a retainer axis 144 defined as extending from the proximal end 138 to the distal end 138. A flange portion 150 may be disposed between the proximal portion 140 and the distal portion 142. A cassette compartment 146 may extend along the retainer axis 144. Referring to FIG. 17, the cassette compartment 146 may be configured to restrainingly engage at least a portion of the lock cassette 200 therein with the grip portion 206 projecting outward of the proximal end 136. The lock retainer 134 and lock cassette 200 thereby combining to define a lock subassembly 168.

Referring to FIGS. 33 to 36, the lock subassembly 168 is preferably configured to be placed in removable securement with the first frame segment 110a, whereat (i) the proximal portion 140 is in received engagement with the retainer mounting aperture 132; (ii) the grip portion 206 projects outward of the first outboard face 118a, and (iii) the grip portion 206 is configured to grippingly engage the lock engagement channel 124 when the second outboard face 118b is placed adjacent to the first outboard face 118a and the grip portion 206 is moved to the grip configuration (as shown, for example, in FIG. 35).

Referring to FIG. 35, in particular implementations of the modular wall frame system 100 the flange portion 150 may be is configured to abut the first inboard face 116a when lock subassembly is in the removable securement.

Referring to FIGS. 33, 36 and 37, in certain embodiment of the modular wall frame system 100, (a) the first frame segment 110a may include an auxiliary channel 128 inward of the first inboard face 116a. The auxiliary channel 128 generally includes a pair of laterally disposed auxiliary channel lips 130. The lock retainer 134 may include a retainer detent 154 moveable between a securing position and a releasing position. The retainer detent 154 may be configured to (i) engage the lips 130 of the auxiliary channel 128 when in the securing position (see, for example, FIGS. 35 and 36), and thereby maintain the lock subassembly 168 in the removeable securement; and (ii) disengage the lips 130 of the auxiliary channel 128 when moved to the releasing position (see, for example, FIG. 37). When the lock subassembly is in removeable securement with a first frame segment 110a, and the grip portion of the lock cassette is in gripping engagement with the lock engagement channel 124 of the second frame segment 110b, the first wall frame element 102a and second wall frame element 102b are secured in connection to one another.

Referring to FIGS. 6 and 36, a lip retention gap 166 may be defined between the retainer detent 154 and the flange portion 150. The lip retention gap 166 may be configured to receive auxiliary channel lips 130 of the auxiliary channel 128 when the lock subassembly 168 is in the removeable securement.

Figure 39:
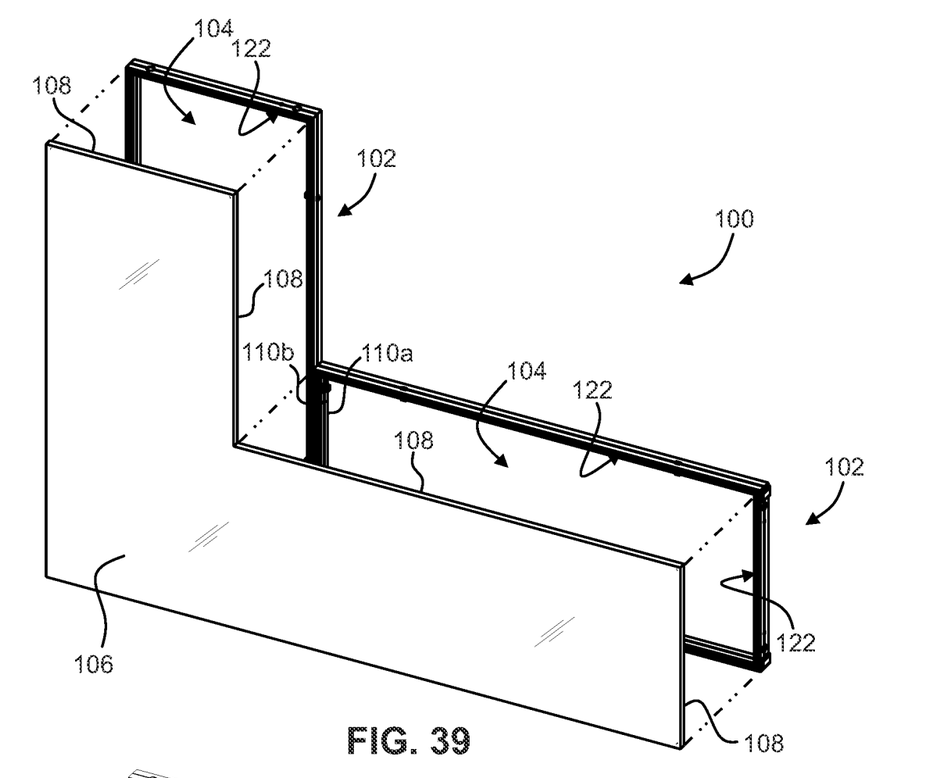
FIG. 39 is a diagrammatic perspective view of an example modular wall frame system showing a wall panel in the process of being affixed to the framework by way of insertion of peripheral panel mounting elements to corresponding panel retention channels in the framework.
Figure 40:
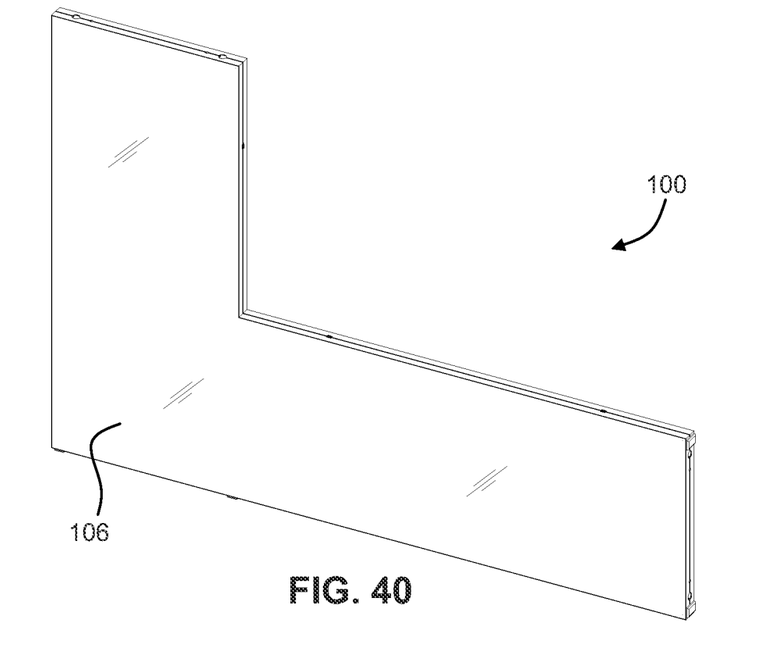
FIG. 40 is a diagrammatic perspective view similar to that of FIG. 39, but wherein the wall panel is shown fully affixed to the corresponding framework.

Referring to FIGS. 34, 39 and 40, once the adjacent wall frame elements 102 are connected to form an assembled modular wall frame system 100, one or more respective wall panels 106 may be attached to the system. By way of example, a wall panel 106 may be comprised of a flexible material, such as a fabric, on which graphics may be printed or attached. Such a wall panels 106 may include panel mounting elements 108 (for example, plastic strips) distributed about their periphery. The mounting elements 108 may be configured to be inserted into corresponding panel retention channels 122 disposed in lateral portions 120 of the frame segments 110. As a result, the panel element 106 may extend across the frame element apertures 104 of the system 100 in tension.

Figure 41:
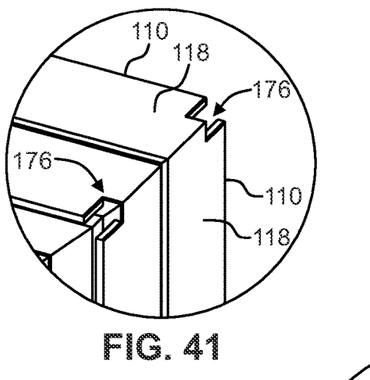
FIG. 41 is a magnified view of detail 41 in FIG. 24, illustrating one potential configuration of a channel continuity relief at the corner joint between a corresponding pair of frame segments.
Figure 42:
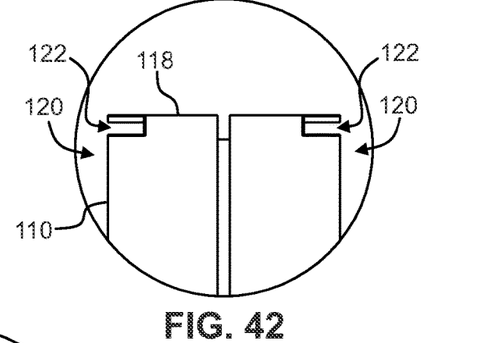
FIG. 42 is a magnified view of detail 42 in FIG. 27, illustrating the channel continuity relief in FIG. 41 from a different viewpoint.
Figure 43:
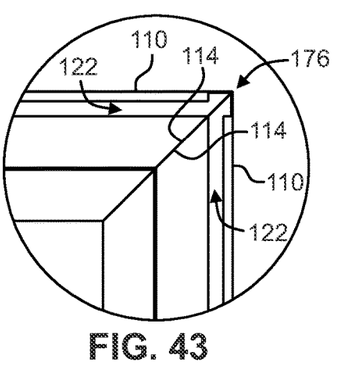
FIG. 43 is a magnified view of detail 43 in FIG. 26, illustrating the channel continuity relief in FIG. 41 from yet another viewpoint.

FIGS. 41-43 illustrate one potential configuration of a channel continuity relief 176 at the corner joint between a corresponding pair of frame segments 110, where the segment ends 114 are joined together (for example, by welding). Channel continuity reliefs 176 allow a single elongated panel mounting element 108 to extend continuously from one panel retention channel 122 in one wall frame element 110 to a second panel retention channel 122 in an adjacent wall frame element 110.

Figure 44:
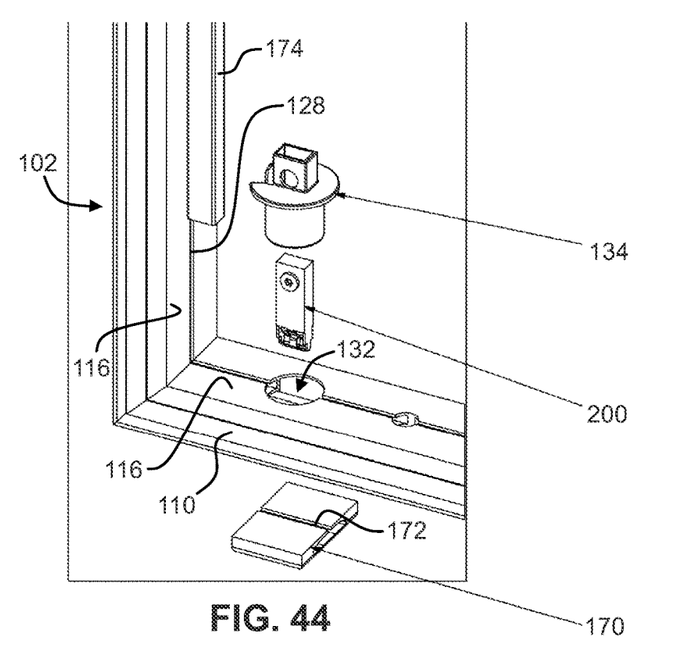
FIG. 44 is a partial perspective view illustrating a potential usage of a lock subassembly to lock a bumper foot to a bottom frame segment.

FIG. 44 illustrates a potential implementation of a lock subassembly 168 to lock a bumper foot 170 to a bottom frame segment 110. In such an implementation, the grip portions 206 of the lock cassette 200 may engage a foot lock groove 172 in the lockable bumper foot 170. Moreover, a wire guide 174 is shown attached to the auxiliary channel 128.

The following listing matches certain terminology used within this disclosure with corresponding reference numbers used in the non-limiting examples and implementations illustrated in the several figures.

100 modular wall frame system
102 wall frame element (e.g., first and second wall frame elements 102a and 102b)
104 frame element aperture
106 wall panel 108 panel mounting elements
110 frame segment (e.g., first frame segment 110a and second frame segment 110b)
112 segment axis
114 segment end
116 inboard face (e.g., first inboard face 116a and second inboard face 116b)
118 outboard face (e.g., first outboard face 118a and second outboard face 118b)
120 lateral portion
122 panel retention channel
124 lock engagement channel (e.g., in outboard face)
126 lock channel lips
128 auxiliary channel
130 auxiliary channel lips
132 retainer mounting aperture
134 lock retainer
136 proximal end
138 distal end
140 proximal portion
142 distal portion
144 retainer axis
146 cassette compartment
148 actuator port
150 flange portion
152 relief groove
154 retainer detent
156 ramped face
158 detent lever (e.g., cantilever)
160 fixed end
162 free end
164 release actuation portion (e.g., user-engageable)
166 lip retention gap
168 lock subassembly (lock cassette assembled with lock retainer)
170 lockable bumper foot
172 foot lock groove
174 wire guide (e.g., insertable into auxiliary channel)
176 channel continuity relief
178 manual force
200 lock cassette
202 cassette axis
204 cassette housing
206 grip portion
208 grip elements
210 grip actuation element (e.g., engageable by a torquing tool)

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A lock retainer for facilitating the secured connection of an adjacent pair of wall frame elements to one another by way of a lock cassette having an actuatable grip portion, the lock retainer comprising:
a proximal portion defining a proximal end, a distal portion defining a distal end, and a retainer axis defined as extending from the proximal end to the distal end, a flange portion being disposed between the proximal portion and the distal portion, a cassette compartment extending along the retainer axis and configured to retainingly engage at least a portion of the lock cassette therein with the grip portion remaining outward of the proximal end;
wherein the proximal portion is configured to be placed in mounted engagement with a retainer mounting aperture in a frame segment of a wall frame element;
wherein the retaining engagement is configured to obstruct relative translational movement between the lock cassette and the lock retainer along the retainer axis; and
wherein the distal portion includes an actuator port open laterally of the retainer axis, the actuator port being configured to receive a grip actuation element of the lock cassette.

2. The lock retainer as defined in claim 1 wherein the receipt of the grip actuation element facilitates the obstruction of relative translational movement.

3. The lock retainer as defined in claim 1 wherein the retaining engagement obstructs relative rotation between the lock cassette and the lock retainer about the retainer axis.

4. A lock retainer for facilitating the secured connection of an adjacent pair of wall frame elements to one another by way of a lock cassette having an actuatable grip portion, the lock retainer comprising:
a proximal portion defining a proximal end, a distal portion defining a distal end, and a retainer axis defined as extending from the proximal end to the distal end, a flange portion being disposed between the proximal portion and the distal portion, a cassette compartment extending along the retainer axis and configured to retainingly engage at least a portion of the lock cassette therein with the grip portion remaining outward of the proximal end, and a retainer detent moveable between a securing position and a releasing position;
wherein the proximal portion is configured to be placed in mounted engagement with a retainer mounting aperture in a frame segment of a wall frame element; and
wherein the retaining engagement is configured to obstruct relative translational movement between the lock cassette and the lock retainer along the retainer axis.

5. The lock retainer as defined in claim 4 wherein a lip retention gap is defined between the retainer detent and the flange portion.

6. The lock retainer as defined in claim 5 wherein the retainer detent is resiliently biased toward the securing position.

7. The lock retainer as defined in claim 6 wherein the retainer detent is on a detent lever with a fixed end and a free end, the free end having a release actuation portion thereat which is configured to enable a user to manually overcome the resilient bias.

8. The lock retainer as defined in claim 7 wherein
(a) the fixed end is affixed to the proximal portion; and
(b) the retainer detent is disposed between the fixed end and the release actuation portion.

9. The lock retainer as defined in claim 8 wherein the flange portion extends radially outward of the retainer axis.

10. The lock retainer as defined in claim 9 wherein the flange portion includes a relief groove by which the release actuation portion extends through the flange portion.

11. The lock retainer as defined in claim 6 wherein the retainer detent includes a ramped face oriented toward the proximal end.

12. The lock retainer as defined in claim 6 wherein the proximal portion is cylindrical.

13. A modular wall frame system comprising:
- a first wall frame element including a first frame segment, the first frame segment being elongated along a first segment axis and including a first inboard face and a first outboard face, a retainer mounting aperture extending between the first inboard face and the first outboard face;
- a second wall frame element including a second frame segment, the second frame segment being elongated along a second segment axis and having a second outboard face with a lock engagement channel disposed inward thereof;
- a lock cassette having a grip portion and a grip actuation element, the grip portion being movable between a grip configuration and a neutral configuration by way of the grip actuation element; and
- a lock retainer including a proximal portion defining a proximal end, a distal portion defining a distal end, and a retainer axis defined as extending from the proximal end to the distal end, a flange portion being disposed between the proximal portion and the distal portion, a cassette compartment extending along the retainer axis;

wherein
- (a) the cassette compartment is configured to retainingly engage at least a portion of the lock cassette therein with the grip portion projecting outward of the proximal end, the lock retainer and lock cassette thereby combining to define a lock subassembly, and
- (b) the lock subassembly is configured to be placed in removable securement with the first frame segment, whereat
  - (i) the proximal portion is in received engagement with the retainer mounting aperture,
  - (ii) the grip portion projects outward of the first outboard face, and
  - (iii) the grip portion is configured to grippingly engage the lock engagement channel when the second outboard face is placed adjacent to the first outboard face and the grip portion is moved to the grip configuration.

14. The modular wall frame system as defined in claim 13, wherein the flange portion is configured to abut the first inboard face when lock subassembly is in the removable securement.

15. The modular wall frame system as defined in claim 13 wherein the distal portion includes an actuator port open laterally of the retainer axis, the actuator port being configured to receive the grip actuation element and thereby obstruct relative translational movement between the lock cassette and the lock retainer along the retainer axis.

16. The modular wall frame system as defined in claim 13 wherein the retaining engagement obstructs relative rotation between the lock cassette and the lock retainer about the retainer axis.

17. The modular wall frame system as defined in claim 13 wherein
- (a) the first frame segment includes an auxiliary channel inward of the first inboard face; and
- (b) the lock retainer includes a retainer detent moveable between a securing position and a releasing position, the retainer detent being configured to
  - (i) engage the auxiliary channel when in the securing position, and thereby maintain the lock subassembly in the removeable securement; and
  - (ii) disengage the auxiliary channel when moved to the releasing position.

18. The modular wall frame system as defined in claim 17 wherein a lip retention gap is defined between the retainer detent and the flange portion, the lip retention gap being configured to receive auxiliary channel lips of the auxiliary channel when the lock subassembly is in the removeable securement.

19. The modular wall frame system as defined in claim 17 wherein the retainer detent is resiliently biased toward the securing position.

20. The modular wall frame system as defined in claim 19 wherein the retainer detent is on a detent lever with a fixed end and a free end, the free end having a release actuation portion thereat which is configured to enable a user to manually overcome the resilient bias.

21. The modular wall frame system as defined in claim 20 wherein
- (a) the fixed end is affixed to the proximal portion; and
- (b) the retainer detent is disposed between the fixed end and the release actuation portion.

22. The modular wall frame system as defined in claim 21 wherein the flange portion extends radially outward of the retainer axis and includes a relief groove by which the release actuation portion extends through the flange portion.

23. The modular wall frame system as defined in claim 19 wherein the retainer detent includes a ramped face oriented toward the proximal end.

* * * * *